No. 736,138. PATENTED AUG. 11, 1903.
D. McLAUGHLIN.
LOAD RETAINING OR RELEASING MEANS FOR VEHICLES.
APPLICATION FILED JUNE 5, 1902.
NO MODEL.
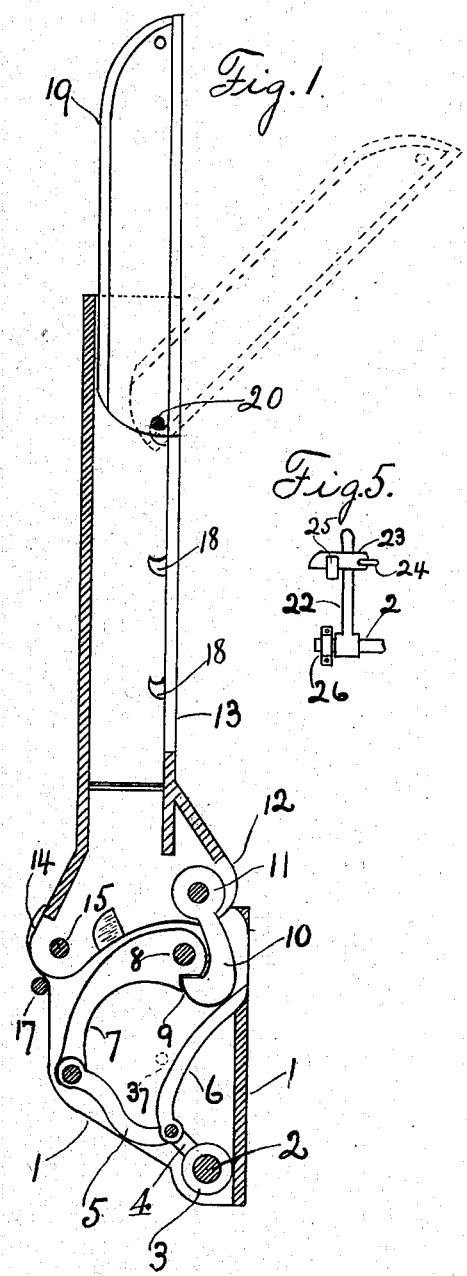
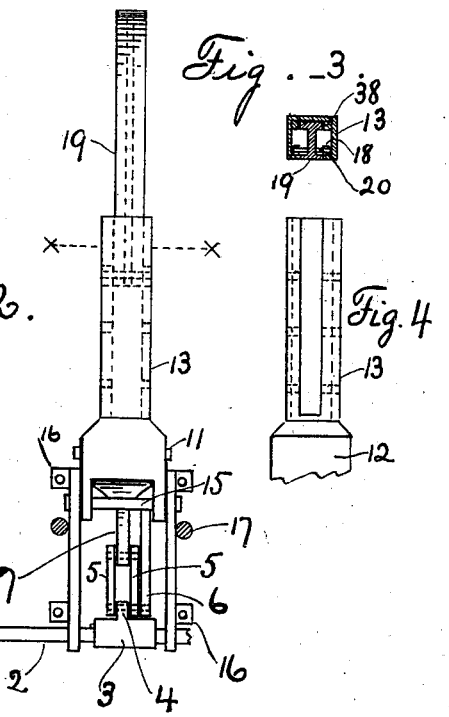
Witnesses
H. G. Gearlock
Mabel Dean.
Inventor
David McLaughlin
by James T. Watson
his Attorney No. 736,138.

Patented August 11, 1903.

UNITED STATES PATENT OFFICE.

DAVID McLAUGHLIN, OF DULUTH, MINNESOTA, ASSIGNOR OF ONE-HALF TO DULUTH LOG COMPANY, A CORPORATION OF MINNESOTA.

LOAD RETAINING OR RELEASING MEANS FOR VEHICLES.

SPECIFICATION forming part of Letters Patent No. 736,138, dated August 11, 1903.

Application filed June 5, 1902. Serial No. 110,307. (No model.)

*To all whom it may concern:*

Be it known that I, DAVID MCLAUGHLIN, a citizen of the United States, residing at Duluth, in the county of St. Louis and State of Minnesota, have invented certain new and useful Improvements in Load Retaining or Releasing Means for Vehicles; and I do hereby declare the following to be a full, clear, and exact description of the invention, such as will enable others skilled in the art to which it appertains to make and use the same.

My invention relates to load-retaining means for vehicles, and particularly for platform-cars and logging-cars, and has for its object the provision of permanent pivotal stakes which may be released from operative position without danger to the operator.

With this and other objects in view it consists of a bracket extending from the sill or bolster at the side of the car, a stake pivoted in said bracket, a hook pivoted on said stake, a lever pivoted on said bracket and provided with a jaw to engage said hook, means for controlling said lever and governed by a shaft, a shaft supported in a position parallel with the side of said car and governing said controlling means, an operating-lever for rotating said shaft, and a latch for securing said operating-lever.

It further consists of certain other constructions, combinations, and arrangements of parts, as will be hereinafter described and claimed.

In the drawings, Figure 1 is a side elevation, partly in section, of my said stake. Fig. 2 is a front elevation of the same. Fig. 3 is a horizontal section of a portion of said stake on the line x x of Fig. 2. Fig. 4 is a rear elevation of a portion of said stake. Fig. 5 is a front elevation of said shaft-operating lever and securing means therefor.

In the drawings, 1 is a bracket, preferably forming the support of a shaft 2, which may, if desired, be constructed of gas-pipe, to which is rigidly secured a collar 3, formed with an eccentric lug 4, to which are pivotally secured the lower ends of two link-levers 5, whose upper ends are pivotally secured to the lower end of a lever 7, pivoted at the upper end upon a bolt 8, projected through said bracket, the said upper end of which lever 1 is formed with a jaw 9, adapted in operative position to engage a hook 10, pivoted at the upper end of its shank portion upon a bolt 11 to the heel 12 of a stake 13. A dog or wedge-arm 6 is also pivoted at its lower end to said lug 4 and adapted at its upper end in operative position to force said hook 10 into engagement with the jaw of said lever 7. The toe 14 of said stake 13 is pivoted in said bracket upon a bolt 15. Apertured ears 16 are preferably formed upon said bracket for attaching the same to said car by means of bolts (not shown) passing through the same. A U strap or bolt 17 is also preferably passed around said bracket for securing the same to the car, and any other or additional means for such attaching purpose may be employed within the scope of my said invention. Said stake 13 is preferably hollow and approximately box-shaped and formed with one or more pairs of brackets 18 on different planes, projecting inwardly from its rear wall and adapted to support a telescopic stake 19 by means of a bolt 20, passed through the lower end of said telescopic stake and lying across one or the other of said pairs of brackets 18. The rear wall of said stake 13 is vertically divided for a portion of its depth to permit the rearward fall of said telescopic stake 19, which is, however, prevented from total disengagement from said portion 13 by the engagement of the ends of said bolt 20 with the divided portions of said rear wall. An operating-lever 22, preferably located near the end of the car, is rigidly secured to said shaft 2 and in operative position is secured against movement by a latch 23, secured at one end to said car by a staple 24 and resting at the opposite end in a hook 25. One or more straps or brackets 26 may, if desired, be provided for further supports for said shaft 2. In operation when said stake 13 is raised to a vertical position the broad hook 10 drops by gravity into approximate operative position. The lever 22 is then raised to a vertical position, causing the partial rotation of the shaft 2 and of the eccentric 4, thereby raising the pivoted link-levers 5 and the foot of lever 7, causing the pivoted head of the last said lever to make a partial revolution on its axis 8, so that its jaw 9 will engage said hook 10, which hook is simultaneously thrust into closer engagement and wedged in position by the wedge-arm or dog 6, which is raised into position by the aforesaid movement of the eccentric 4. The latch 23 is then adjusted to retain said operating-lever 22 in position. It will be observed that the telescopic section of said stake is adapted to take a position at an angle to said stake 13, and when said portion 13 is lowered to release the load said section 19 will lie approximately level with the ground, whereby a long incline from the bracket 1 to the ground is avoided and the danger of breaking the stake by falling logs is largely obviated. Said telescopic portion is also advantageous for gradually extending the stake as the load is put on and in proportion to the load, whereby the necessity of lifting all of the load over the tops of the full-length stakes is avoided. To telescope said section, the section is inclined toward the car and then thrust backward, so the bolt 20 will clear the brackets 18, and is then lowered as far as desired and raised again to a vertical position.

It is obvious that my said constructions may be modified or altered in minor details within the scope of my said invention. It is also obvious that any desired number of said stakes or chain-releasers, or both, may be employed on one car and that one or more such stakes or chain-releasers, or both, may may be operated by one shaft 2 and operating-lever 22 within the scope of my said invention.

What I claim, and desire to secure by Letters Patent, is—

1. The combination with a suitable support of a stake pivotally secured at its foot thereto, a hook pivoted to said stake, controlling means pivoted to said support and adapted to engage said hook, a shaft journaled in bearings on said support, governing means secured to said shaft and pivoted to said controlling means for operating said controlling means, and means for operating said shaft, substantially as described.

2. The combination with a vehicle of a bracket secured to and extending from the side thereof; a stake pivotally secured at its foot to said bracket, and provided with a pivoted hook adapted to engage controlling means pivoted to said bracket and adapted to engage said hook; a horizontal shaft journaled in supports on the side of said vehicle; governing means secured to said shaft and to said controlling means for operating said controlling means; means secured to said shaft and adapted in operative position to lock said hook and said controlling means in engagement, and means for locking said shaft in operative position, substantially as described.

3. The combination with a vehicle of a bracket secured to and extending from the side thereof; a stake pivoted at its foot to said bracket, and provided with a pivoted hook adapted to engage controlling means independently pivoted to said bracket; controlling means pivoted to said bracket independently of said stake and adapted in operative position to engage said hook; a horizontal shaft journaled in supports secured to said car and extending from the side thereof; governing means connected to said shaft and to said controlling means and adapted to operate said controlling means; means secured to said shaft and adapted, in operative position, to secure said hook in engagement with said controlling means; a lever for operating said shaft and a latch for securing said lever in operative position, substantially as described.

4. The combination with a vehicle of a bracket secured to and extending from the side thereof; a stake pivoted at its foot to said bracket, and provided with a pivoted hook adapted to engage controlling means secured to said bracket; controlling means, comprising a controlling-lever pivoted at its upper end to said bracket and provided at said end with a jaw adapted to engage said hook; a horizontal shaft journaled in supports secured to and extending from the side of said car; an eccentric-collar keyed to said shaft; a link-lever pivoted at one end to said collar and pivoted at the other end to the lower end of said controlling-lever and adapted when said shaft is partly rotated in one direction to cause said controlling-lever to make a partial revolution on its axis into operative position, and when said shaft is partly rotated in the opposite direction to reverse the movement of said controlling-lever; and means for operating said shaft, substantially as described.

5. The combination with a vehicle of a bracket secured to and extending from the side thereof; a stake pivoted at its toe to said bracket, and provided with a depending hook pivoted to its heel and adapted to engage controlling means secured to said bracket; controlling means pivoted to said bracket independently of said stake and comprising a lever provided with a jaw adapted to engage said hook; a horizontal shaft extending parallel with the side of said vehicle and journaled in supports secured to and extending therefrom; an eccentric-collar secured to said shaft and means pivotally secured at their lower ends to the outward projection of said collar and pivotally secured at their upper ends to the lower end of said lever and adapted to cause the engagement or disengagement of said jaw with said hook, according as said shaft is rotated in one or the other direction; a wedge-arm pivoted at its lower end to the outward projection of said collar and adapted in operative position to project slightly into the space behind said hook and wedge the same into engagement with said jaw; means for operating said shaft and means for securing the same against rotation, substantially as described.

6. The combination with a vehicle of a bracket secured to the side thereof; a hollow stake pivoted at its foot thereto and formed with a vertical division through its rear wall extending from the top of said stake for a predetermined distance toward the foot thereof; brackets arranged in pairs projecting inwardly from the wall of said stake, one of each pair being on one side of said division and the other being on the other side thereof, said pairs being on respectively different planes and respectively adapted to support the pivoting means of a telescopic stake; a telescopic stake adapted to be raised and lowered in said hollow stake; means adapted to pivotally support said telescopic stake on either of said pairs of brackets, according to the height to which said telescopic stake is desired to be extended, the combination being such that said telescopic stake is adapted to fall radially outward, through said division, in the opposite direction to the direction in which said hollow stake is designed to fall; and means governing the position of said hollow stake, substantially as described.

In testimony whereof I hereunto affix my signature in presence of two witnesses.

DAVID McLAUGHLIN.

Witnesses:
JAMES T. WATSON,
PHINEAS AYER.